(12) United States Patent
Pfitzmann et al.

(10) Patent No.: US 11,481,682 B2
(45) Date of Patent: Oct. 25, 2022

(54) DATASET MANAGEMENT IN MACHINE LEARNING

(71) Applicant: INTERNATIONAL BUSINESS MACHINES CORPORATION, Armonk, NY (US)

(72) Inventors: Birgit Monika Pfitzmann, Wettswil (CH); Dorothea Wiesmann Rothuizen, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 16/868,565

(22) Filed: May 7, 2020

(65) Prior Publication Data
US 2021/0350274 A1    Nov. 11, 2021

(51) Int. Cl.
*G06N 20/00* (2019.01)
*G06F 11/34* (2006.01)

(52) U.S. Cl.
CPC ......... *G06N 20/00* (2019.01); *G06F 11/3409* (2013.01)

(58) Field of Classification Search
CPC ...... G06N 5/04; G06N 20/00; G06F 11/3409; G06F 17/17; G06F 17/18; G06F 30/27; H04L 43/08
See application file for complete search history.

(56) References Cited

U.S. PATENT DOCUMENTS

| 9,164,961 | B2 | 10/2015 | Kolachina |
| 10,303,978 | B1 | 5/2019 | Kang |
| 2018/0285694 | A1* | 10/2018 | Kobayashi ............. G06N 20/20 |
| 2019/0095785 | A1 | 3/2019 | Sarkar |
| 2019/0164070 | A1 | 5/2019 | Gupta |
| 2019/0164083 | A1 | 5/2019 | Modarresi |

(Continued)

OTHER PUBLICATIONS

Gallistel et al., "The learning curve: Implications of a quantitative analysis", https://www.ncbi.nlm.nih.gov/pmc/articles/PMC516535/, Proc Natl Acad Sci USA. Sep. 7, 2004; 101(36): 13124 13131, PMCID: PMC516535, 24 pages.

(Continued)

*Primary Examiner* — Kan Yuen
(74) *Attorney, Agent, or Firm* — L. Jeffrey Kelly

(57) ABSTRACT

A method, a computer system, and a computer program product for managing a dataset of training samples, labeled by class, during training of a machine learning model is provided. Embodiments of the present invention may include training the model on a sequence of increasing-sized sets of the training samples and testing performance of the model after training with each set to obtain class-specific performance metrics corresponding to each set size. Embodiments of the present invention may include generating class-specific learning curves from the performance metrics for the plurality of classes. Embodiments of the present invention may include extrapolating the learning curves. Embodiments of the present invention may include optimizing a function of the predicted performance metrics to identify a set of augmentation actions to augment the dataset for further training of the model. Embodiments of the present invention may include providing an output indicative of the set of augmentation actions.

20 Claims, 9 Drawing Sheets

(56) References Cited

U.S. PATENT DOCUMENTS

2019/0197435 A1* 6/2019 Kobayashi ............ G06N 5/003
2021/0201190 A1* 7/2021 Edgar .................... G06N 5/04

OTHER PUBLICATIONS

Https://mlr.mlr-org.com/articles/tutorial/learning_curve.html "Learning Curve Analysis", mlr, Accessed on Feb. 11, 2020, 6 pages.
Https://stats.stackexchange.com/questions/145858/interpret-learning-curves, "Interpret learning curves", Cross Validated, Accessed on Feb. 10, 2020, 1 page.
Https://www.dataquest.io/blog/learning-curves-machine-learning/, "Tutorial: Learning Curves for Machine Learning in Python", Accessed on Feb. 10, 2020, 17 pages.
Ng, "Learning curve", https://www.ritchieng.com/machinelearning-learning-curve/, Accessed on Feb. 7, 2020, 11 pages.
Perlich et al., "Tree Induction vs. Logistic Regression: A Learning-Curve Analysis", Journal of Machine Learning Research 4 (2003) 211-255, Submitted Dec. 2001; Revised Feb. 2003; Published Jun. 2003.
Perlich, "Learning Curves in Machine Learning", IBM Research Report, RC24765 (W0903-020), Mar. 5, 2009, Computer Science, 7 pages.
Pusic et al., "How Much practice Is Enough? Using Learning Curves to Assess the Deliberate Practice of Radiograph Interpretation", Academic Medicine: Jun. 2011—vol. 86—Issue 6—p. 731-736.
Scikit-Learn Developers, "3.5. Validation curves: plotting scores to evaluate models", © 2007-2019, 3 pages.
Smunt, "Learning Curve Analysis", https://link.springer.com/referenceworkentry/10.1007%2F1-4020-0612-8_504, (2000), 5 pages.
Mell et al., "The NIST Definition of Cloud Computing", Recommendations of the National Institute of Standards and Technology, Special Publication 800-145, Sep. 2011, 7 pages.

\* cited by examiner

| Class: Label | Account Management | Asset | Service Desk | End User | Security | Infrastructure | Mobility | Other Services | Storage |
|---|---|---|---|---|---|---|---|---|---|
| Account Management | 30 | | 16 | 5 | 1 | 1 | | | |
| Asset | 15 | 7 | | 3 | | | | | |
| Service Desk | 9 | | 9 | 1 | 3 | | | | |
| End User | 5 | 1 | 7 | 21 | 1 | | | | 1 |
| Security | 5 | | 6 | 3 | 58 | 2 | | | |
| Infrastructure | 9 | 1 | 9 | 1 | 3 | | 18 | | |
| Mobility | | | | 10 | | | 18 | | |
| Other Services | 1 | | 1 | | 2 | | | 5 | |
| Storage Server | | | | | 1 | | | | 19 |
| Shared | 5 | | 2 | 1 | 1 | | | | |
| Continuity | | | | | | | | | |
| Databases | | | | | | | | | |

Figure 7

| \|D\| | Class A | Class B | Class C |
|---|---|---|---|
| 500 | 300 | 150 | 50 |
| 1000 | 700 | 200 | 100 |
| 1500 | 700 | 400 | 400 |

Figure 8a

|  | $p=1$ | $p=2$ | $p=3$ |
|---|---|---|---|
| Class A size | 0 | 233 | 467 | 700 |
| Recall | 0 | 50 | 75 | 85 |
| Precision | 0 | 30 | 50 | 60 |

|  | $p=1$ | $p=2$ | $p=3$ |
|---|---|---|---|
| Class B size | 0 | 133 | 267 | 400 |
| Recall | 0 | 40 | 65 | 80 |
| Precision | 0 | 15 | 55 | 75 |

Figure 8b

DATASET MANAGEMENT IN MACHINE LEARNING

BACKGROUND

The present invention relates generally to dataset management in machine learning. Machine learning involves inherently complex processing of large quantities of training data. Significant processing resources, usually provided by powerful processing systems using multi-core central processing units (CPUs), often with accelerators such as graphics processing units (GPUs) and field-programmable gate arrays (FPGAs), are required for practical implementation.

SUMMARY

Embodiments of the present invention disclose a method, a computer system, and a computer program product for managing a dataset of training samples, labeled by class, during training of a machine learning model. Embodiments of the present invention may include training the model on a sequence of increasing-sized sets of the training samples and testing performance of the model after training with each set to obtain, for a plurality of the classes, class-specific performance metrics corresponding to each set size. Embodiments of the present invention may include generating class-specific learning curves from the performance metrics for the plurality of classes. Embodiments of the present invention may include extrapolating the learning curves to obtain predicted performance metrics for higher numbers of training samples in the plurality of classes. Embodiments of the present invention may include optimizing a function of the predicted performance metrics, indicating a predicted improvement in model performance, to identify a set of augmentation actions to augment the dataset for further training of the model. Embodiments of the present invention may include providing an output indicative of the set of augmentation actions.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 7 shows an example of a confusion matrix used in the FIG. 6 method;

FIG. 8a indicates class-distribution of training samples during operation of a dataset management process;

FIG. 8b indicates performance metrics for FIG. 8a classes; and

DETAILED DESCRIPTION

Figure 1:
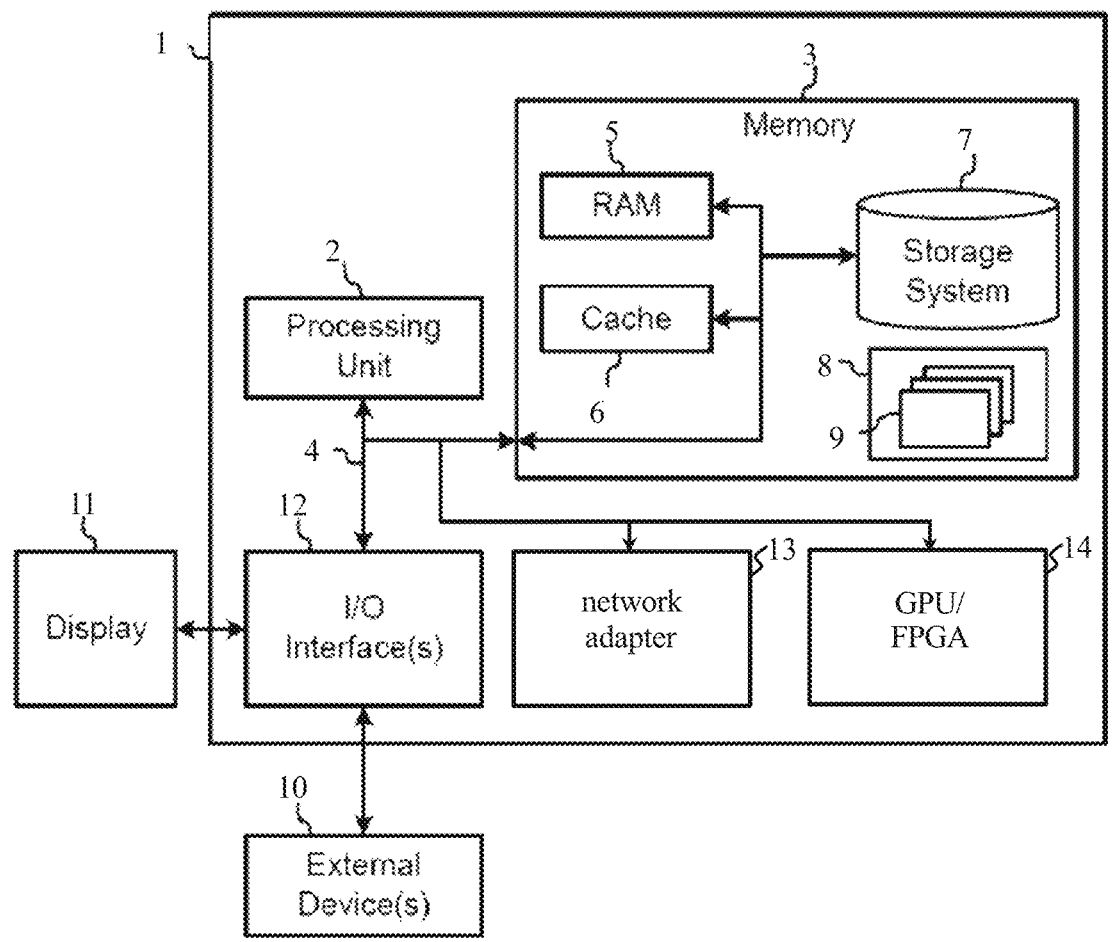
FIG. 1 is a schematic representation of a computing system for implementing machine learning (ML) management methods embodying the invention.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Computer-implemented methods are provided for managing datasets of training samples during training of machine learning (ML) models, together with training methods and systems employing such dataset management. Machine learning is a cognitive computing technique that allows a processing system to "learn" procedures for tackling complex tasks which are not programmed in a conventional manner. Machine learning involves processing typically a large dataset of training samples from some real-world application in relation to a basic model for the application in order to train, or optimize, the model for the application in question. The model can then be applied to perform tasks based on new data generated in that application.

Machine learning techniques are used in numerous applications in science and technology. Some examples include computer vision, audio/video analysis, speech recognition and other natural language processing, medical diagnosis, genetic analysis, pharmaceutical drug design, and numerous applications in computer systems and network environments such as load management, fault analysis, intruder detection, email filtering, and system/network maintenance.

Machine learning involves inherently complex processing of large quantities of training data. Significant processing resources, usually provided by powerful processing systems using multi-core central processing units (CPUs), often with accelerators such as graphics processing units (GPUs) and field-programmable gate arrays (FPGAs), are required for practical implementation. Training a model is thus a compute-intensive and time-consuming task, and performance of the trained model is ultimately dependent on the training data provided. For some models, e.g. specific to a particular industry or specialized application, the training data may be rare. Specialized datasets must be generated for training, involving significant investment of resources in acquisition of suitable data. Sufficient volumes of suitable training data samples may need to be generated and also labeled by class according to some application-specific classification system. In other applications, large volumes of data may be available but the data quality, in terms of accuracy and/or relevance, may be unknown. In all applications, provision of appropriate training datasets is fundamental to both training efficiency and model performance in the application in question.

According to at least one embodiment of the present invention there is provided a computer-implemented method for managing a dataset of training samples, labeled by class, during training of a machine learning model. The method involves training the model on a sequence of increasing-sized sets of the training samples and testing performance of the model after training with each set to obtain, for a plurality of the classes, class-specific performance metrics corresponding to each set size. The method includes generating class-specific learning curves from the performance metrics for the plurality of classes, and extrapolating the learning curves to obtain predicted performance metrics for higher numbers of training samples in the plurality of classes. The method further comprises optimizing a function of the predicted performance metrics, indicating a predicted improvement in model performance, to identify a set of augmentation actions to augment the dataset for further training of the model, and providing an output indicative of the set of augmentation actions.

Methods embodying the invention offer strategic management of training datasets during training of machine learning (ML) models. The class-specific learning curves reflect model performance at a class-level, allowing prediction of performance improvements by augmenting individual classes of training samples. An optimal set of augmentation actions, which may involve augmentation of one or more sample classes, can be identified by optimizing a function of the predicted performance metrics for individual classes. The dataset can thus be augmented in a strategic manner based on predicted improvement in overall model performance. Acquisition of new training data and/or a selection of training samples to supplement individual classes can be tailored to tactically advance the training operation. This strategic dataset management offers significant improvements in ML training operations. Resources for a collection/selection of training data can be allocated efficiently, use of processing resources can be reduced by efficient training with the most relevant training data, and more accurate models can be achieved in a resource-efficient manner.

Steps of methods embodying the invention can be performed iteratively in response to implementation of successive sets of actions on the dataset, allowing progressive adaptation of the dataset as required to advance training.

Actions can be conveniently identified from predetermined augmentation action types, such as: providing a number $X_c$ of further training samples in a class c, where $X_c$ and c are specified in the set of actions; labeling a number Y of further training samples, where Y is specified in the set of actions; and labeling training samples in a number Z of sources of further training samples, where Z is specified in the set of actions.

In some embodiments, the function of the predicted performance metrics may be optimized in relation to number of additional training samples, for example, to maximize expected performance improvement for a given number of new samples distributed between the classes. However, actions performed on a dataset inherently involve some notion of "cost" associated with provision of additional training samples and different actions may have different associated costs, whether the cost measured in terms of time, a monetary cost, an effort, a difficulty or a combination of such factors. Advantageously, therefore, cost functions can be defined for respective augmentation actions or action types, and the set of augmentation actions can be identified by optimizing the function of the predicted performance metrics in relation to cost of the set of actions.

In preferred embodiments, a set of target performance metrics is defined for the model, and the function of the predicted performance metrics indicates predicted improvement towards target in model performance. In these embodiments, actions can be selected to optimize the improvement towards a target performance specification for a model, such as to maximize progress towards target for a given cost.

Particularly advantageous embodiments exploit confusion matrices in the dataset management process. Confusion matrices indicate occurrences of a class-confusion in the model and the preferred embodiments use these matrices in various ways to enhance dataset management. For example, when testing performance of the model for at least the largest set of training samples in an iteration of the method, a confusion matrix can be generated for performance of the model over the plurality of classes. Such methods may involve detecting if the predicted performance metrics for one or more of the plurality of classes indicate a sub-threshold performance improvement and, for each such class, identifying one or more other classes having the greatest confusion with that class by analysis of the confusion matrix. These methods may then identify a set of validation actions to validate labels of training samples in the dataset, in dependence on results of this analysis, and provide an output indicative of the set of validation actions. These embodiments address the fact that training data commonly includes labeling errors which can inhibit accurate training. If sub-threshold performance improvement is identified for one class, for particular classes, or overall for the model, a label validation or a label cleaning action may be beneficial and appropriate actions that may be determined by an analysis of the confusion matrix.

Validation actions may be in addition, or alternative, to augmentation actions in any given iteration, and selection of validation actions may also be based on associated action "costs". Validation actions can be conveniently identified from predetermined validation action types that may include validating labels of training samples in a class $c_i$ which were assigned to a class $c_j$ by the model, where $c_i$ and $c_j$ are specified in the set of validation actions, and validating labels of all training samples in a pair of classes $c_i$, $c_j$, where $c_i$ and $c_j$ are specified in the set of validation actions. A cost function can be defined for the validation actions or action types and the set of validation actions can be identified by selecting validation actions in dependence on cost of the set of validation actions.

Particularly advantageous embodiments further exploit confusion matrices by generating further learning curves for variation of those entries with implemented validation actions. Further learning curves may be generated for corresponding entries in the confusion matrices for successive iterations of the method in response to implementation of the set of validation actions. These further learning curves are extrapolated to obtain predicted values of the confusion matrix entries. In an iteration of the method when such further learning curves have been generated, the method may include optimizing a function of both the predicted performance metrics and the predicted confusion matrix values to identify a set of augmentation or validation actions on the dataset for further training of the model.

In addition to class-specific learning curves, preferred methods also generate learning curves for overall model accuracy metrics for the increasing-sized sets, which may indicate model accuracy over all classes. These methods can then accommodate predicted accuracy metrics from the model learning curves in an optimization function.

Respective further aspects of the invention provide methods and computing systems for managing the training of ML models using dataset management methods and computer program products for causing a computing system to implement a dataset management method. In general, when features are described herein with reference to methods embodying the invention, corresponding features may be provided in systems or computer program products that are embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described can be performed as computer-implemented methods for managing training datasets during training of ML models. The methods may be implemented by a computing system comprising one or more general- or special-purpose computers, each of which may comprise one or more (real or virtual) machines, providing functionality for implementing the operations described herein. Steps of methods embodying the invention may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic representation of a computing system for implementing machine learning (ML) management methods embodying the invention is depicted.

FIG. 1 is a block diagram of exemplary computing apparatus for implementing methods embodying the invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as a GPU or FPGA, for implementing embodiments of the invention. In general, such additional processing apparatus may be internal or external to computer 1. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
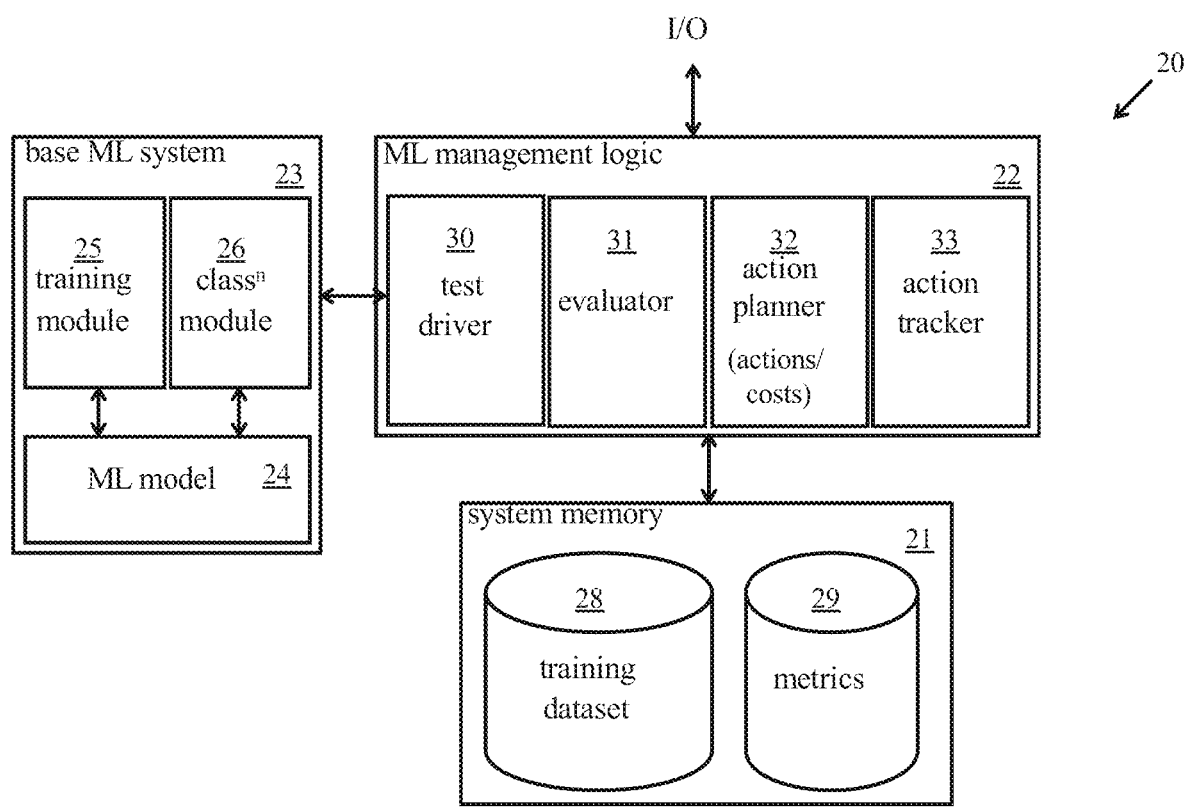
FIG. 2 illustrates component modules of a computing system embodying the invention.

Referring now to FIG. 2, an illustration of component modules of a computing system embodying the invention is depicted. FIG. 2 is a schematic representation of component modules in an exemplary computing system for implementing methods embodying the invention. The system 20 comprises memory 21 and control logic implemented here by ML management (MLM) logic 22. MLM logic 22 manages training of models in a base ML system 23. ML system 23 comprises one or more ML models 24 each having an associated training module 25 and classification module 26.

A model 24 may comprise any of a variety of standard ML model types which can be trained for classification of data samples in accordance with a classification system specific to the model application. In general, such a model may include one or more component models that may operate sequentially or in parallel in a classification operation. Examples of such models include artificial neural networks (ANNs), decision tree models such random forest and gradient boosting models, support vector machines, conditional random fields, word embeddings and contextual word embeddings, logistic regression models, and autoencoders. Training module 25 may include a functionality for training the base model using a variety of model-specific training algorithms. Classification module 26 may include functionality for supplying data samples to be classified to the partially- or fully-trained model to obtain classification results or class assignments for respective samples.

Memory 21 comprises one or more memory/storage components storing a training dataset 28 and a metrics database 29. Training dataset 28 comprises a set of training data samples which are labeled by class according to a classification system defined for a specific application of ML model 24. Each training sample may have an associated label that assigns a sample to one of a plurality of classes defined in the classification system. Metrics database 29 stores various metrics and related results generated by MLM logic 22 in operation. These include performance metrics, learning curves, and in preferred embodiments, confusion matrices.

MLM logic 22 comprises a test driver module 30, a performance evaluator module 31, an action planner module 32, and an action tracker module 33. Each of these modules 30 through 33 comprises functionality for implementing particular steps of an ML management operation detailed below. Functionality of these modules may be implemented by software, such as program modules or hardware, or a combination thereof. These modules interface with memory 21 for data storage/retrieval and perform overall management of the training dataset 28. One or more input/output (I/O) channels provide for communication between MLM logic 22 and operators/users of the system, for example via a GUI (graphical user interface) provided at one or more user computers which may be local or remote from system 20.

In general, the component modules of system 20 may be provided in one or more computers of a computing system. For example, all modules may be provided in a computer 1 at which a GUI is displayed to an operator. Alternatively, for example, system 20 may be implemented as a front-end/back-end system in which base ML system 23 is provided in a back-end server and a front-end computer/server implements MLM logic 22 with memory 21 implemented by local and/or remote storage components. Front-end functionality may be implemented entirely in a user computer or may be wholly or partially implemented in a server which communicates with one or more user computers for operator input/output and interacts with the back-end ML system 23. In operation of system 20, MLM logic performs an iterative method for managing training dataset 28 during training of an ML model 24.

Figure 3:
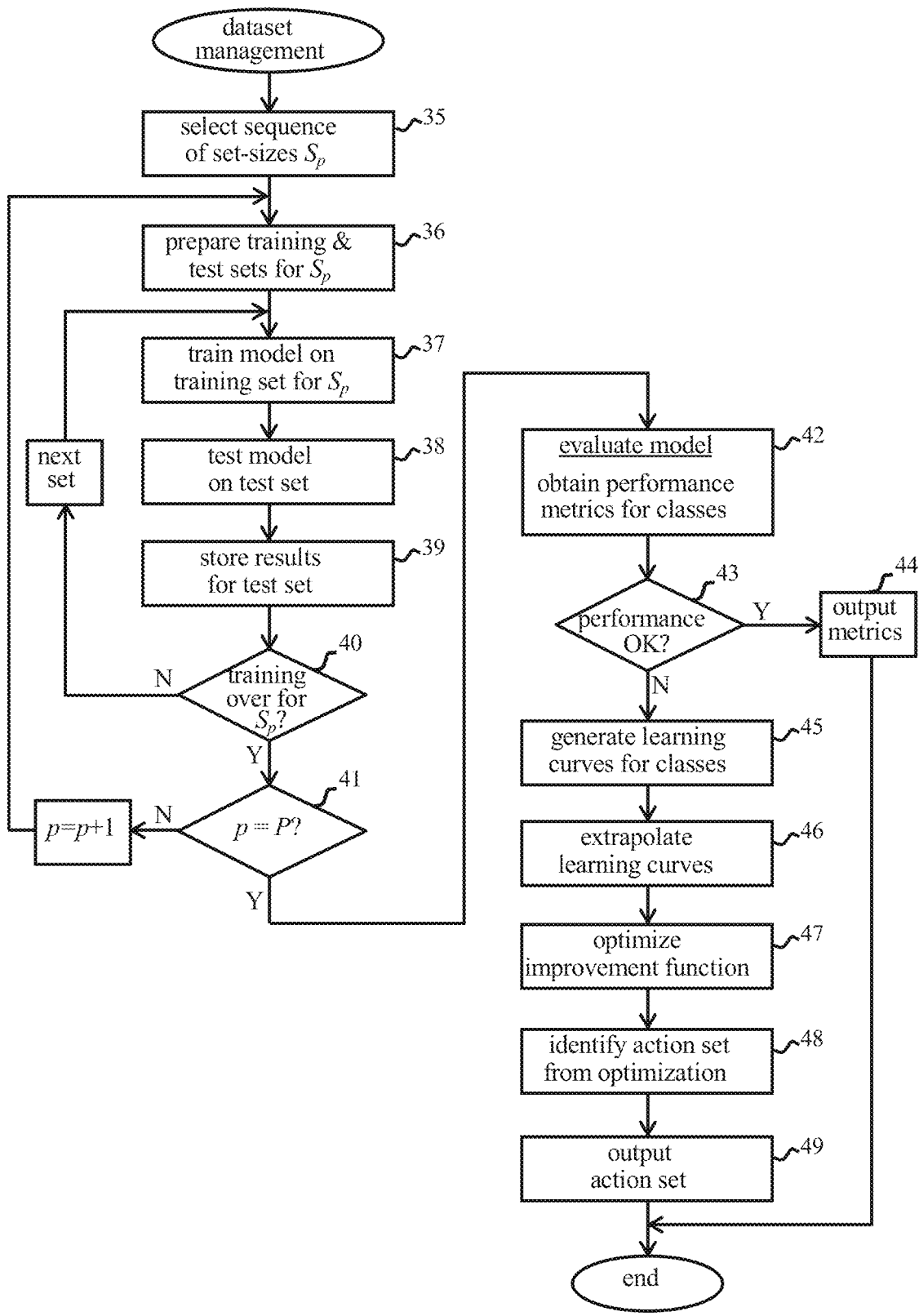
FIG. 3 indicates steps of dataset management method performed by the FIG. 2 system.

Referring now to FIG. 3, the steps of a dataset management method performed by the FIG. 2 system are depicted. Basic steps of the dataset management process are indicated in the flow diagram of FIG. 3. Steps 35 to 41 are performed by the test driver 30. Step 35 represents a selection in test driver 30 of a sequence of set-sizes $S_p$ (p=1, 2, 3, ..., P) for sets of training samples in dataset 28 for training the model 24.

For a current dataset D of size the set-sizes may be defined such that $S_1 < S_2 < S_3 \ldots < |D|$. The entire sequence of set-sizes may be defined in step 35 for the current dataset D, or this sequence may be defined progressively during operation. In step 36, the test driver prepares training and test sets of training samples for a current set size $S_p$, initially $S_{p=1}$. In this step, test driver 30 prepares a number n of random training-sets of size $S_p$ from samples in dataset D. The value of n is predefined in test driver 30, and may be the same for all $S_p$. For all training sets, corresponding test-sets are randomly selected from remaining samples in D.

In step 37, test driver 30 supplies the first training set to the training module 25 of base ML system 23. Training module 25 uses these training samples and their associated labels to train the model via a supervised learning process in which the model parameters are progressively updated. In step 38, test driver 30 supplies the corresponding test set to classification module 26 and the model is then tested to obtain class assignments for the test samples. The classification results may include true labels and class assignments for all test samples. The classification results are stored in metrics database 29 in step 39. If further training sets are available for the current set-size $S_p$, the training phase is incomplete for $S_p$ ("N" at decision step 40) and operation reverts to step 37 for the next training set. When training and testing have been performed for all $S_p$-sized training sets ("Y" at decision step 40), the operation proceeds to decision step 41. Here the test driver determines if p=P, which may determine if the current set-size $S_p$ is the largest in the sequence. If not ("N" at step 41), operation reverts to step 36 for the next set-size $S_{p+1}$ in the sequence. The test driver may operate to train model 24 on the sequence of increasing-sized sets of training samples. The test driver may also test the performance of the model after training with each set. When testing has been performed for all $S_p$, ("Y" at step 41), the current training phase is complete and the operation proceeds to step 42.

Steps 42 to 46 are performed by evaluator module 31. In step 42, evaluator 31 uses the results of the current training phase to evaluate performance of the model. In this step, the evaluator calculates, for a plurality of classes in the sample classification system, class-specific performance metrics corresponding to each set size $S_p$ in the current phase. Performance metrics may be derived for all classes in the current phase. In an alternate embodiment, the performance metrics may be derived for a subset of the classes, such as classes of particular relevance to an application. Examples of these class-specific performance metrics will be described below together with further metrics derived by evaluator 31 in preferred embodiments. All metrics calculated in step 42 are stored in metrics database 29.

In step 43, evaluator 31 uses the metrics obtained for the largest set-size $S_p$ in the current phase to decide if the model is performing at an acceptable level. For example, an acceptable level includes whether the overall accuracy of the model has reached a required level or the model performance otherwise meets a target performance specification for the application. If an acceptable level of model performance is achieved, the performance metrics may include an output to an operator in step 44 and the process terminates. Otherwise, in step 45, the evaluator generates class-specific learning curves from the performance metrics for respective classes. The evaluator may then then extrapolate these learning curves in step 46 to obtain predicted performance metrics (PPMs) for higher numbers of training samples in these classes. Evaluator 31 may store the learning curves and PPMs for the various classes in metrics database 29, and operation proceeds to step 47.

Steps 47 to 49 are performed by action planner module 32. In step 47, this module optimizes a function of the predicted performance metrics which indicates a predicted improvement in model performance. This improvement function may be predefined for system operation or may be dynamically defined based on various factors. The improvement function may be optimized in relation to various parameters as discussed below. Based on this optimization, as indicated in step 48, the action planner identifies an optimal set of one or more augmentation actions to augment the dataset for further training of the model. Such actions may include obtaining certain numbers of additional training samples for one or more classes and/or obtaining a volume of additional samples for distribution between classes. In step 49, the action planner provides an output indicating this set of actions. The action planner output is supplied to action tracker module 33 and may be provided as an output to system users, such as via an operator GUI. This completes the current phase of the database management operation.

Figure 4:
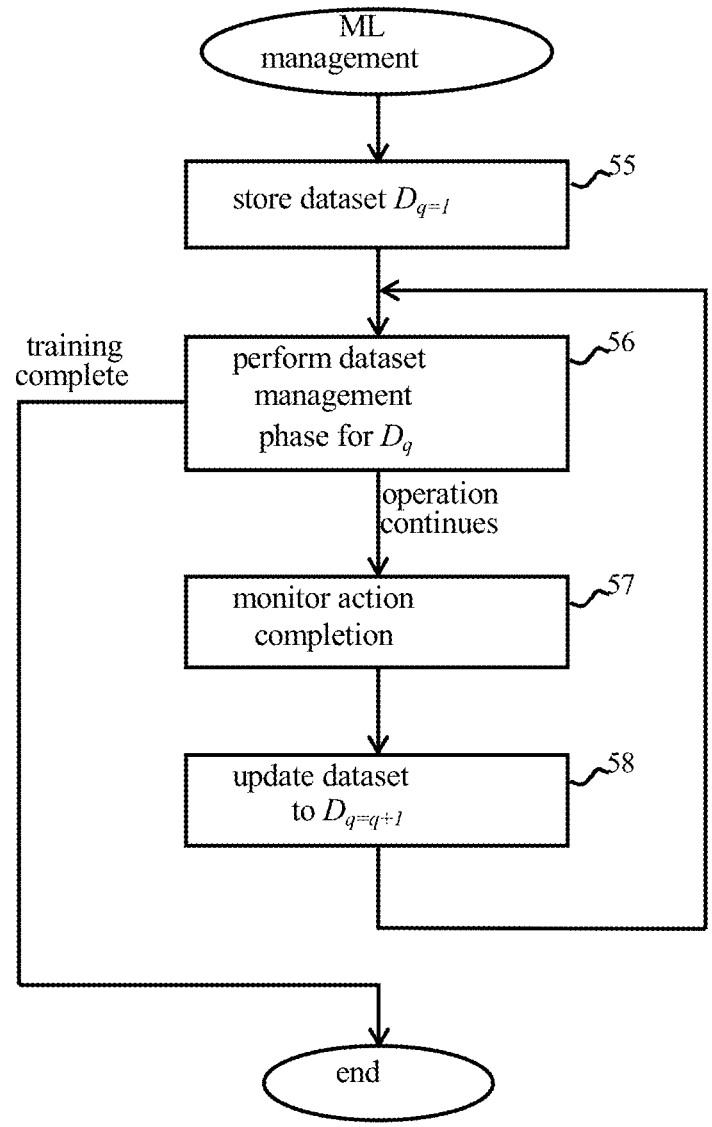
FIG. 4 indicates steps of an iterative machine learning (ML) management process employing the FIG. 3 method.

Referring now to FIG. 4, steps of an iterative machine learning (ML) management process employing the FIG. 3 method are depicted. The above process can be performed iteratively during training of the model 24 as illustrated in FIG. 4.

Step 55 of this training management process represents the storage of an initial training dataset, $D_{q=1}$, in system memory 21. Step 56 represents one phase of the dataset management operation that corresponds to the steps of FIG. 3 for a current iteration q, where initially q=1. Steps 57 and 58 are performed by the action tracker 33 of system 20. This module may provide a workflow- or collaboration-style GUI via that presents the actions output, by action planner 32, to system users. The actions/tasks may be allocated and monitored by managers and the results of implemented actions may be collated. For example, the actions may include an acquisition of further training samples. The dataset 28 is updated on completion of the actions as indicated in step 58, and the operation then reverts to step 56 for another phase of the management operation with an updated dataset $D_{q=q+1}$. The process may iterate or continue iterating in response to an implementation of successive action sets until the model is deemed to be fully-trained at step 43 of FIG. 3.

The above process provides effective management of the training dataset during training of a ML model whereby the dataset is progressively improved in a strategic manner to optimally advance training. Each iteration identifies an optimal set of actions to improve the dataset based on a predicted improvement in model performance. The acquisition or selection of additional training samples for one or more classes may be tailored to tactically advance the training operation. This allows for an efficient allocation of resources for collecting training data, for highly efficient training operations, for enabling accurate models to be achieved with reduced processing resources and/or for training time.

Operation of modules 30 to 32 in exemplary embodiments are described in more detail below. In preferred embodiments, test driver 30 defines sizes for a sequence of P of increasing-sized sets in step 35 of FIG. 3 for each iteration q with a corresponding dataset $D_q$. The number P may be predefined for all datasets $D_q$, such as P=5 or P=10, or may increase with increasing dataset size $|D_q|$. The set sizes $S_p$ are conveniently distributed equidistantly in the range 0 to $|D_q|$. In other embodiments, the set-sizes may be exponentially increasing or otherwise determined based on the dataset size $|D_q|$. For each "point" p in the sequence, n training sets $D_{pi}$ (i=1 to n), of size $S_p$, are randomly selected from $D_q$, where n, for example, may equal 5 (n=5) in a typical embodiment. The test-set for each training set may include the same number $S_p$ of random elements from the remainder of dataset $D_q$ or a percentage, such as 10% to 20%, of the remainder, particularly for larger dataset size $|D_q|$. Testing may be fast and improved metrics may be obtained with larger test-sets containing up to all remaining elements of $D_q$.

Training and testing on a new sequence of sets in each iteration q provides an improved or a beneficial distribution of points for subsequent generation of learning curves in evaluator 31. In some embodiments, such as when computing resources are constrained or a training time is constrained, the sequence of increasing-sized sets may be generated over successive iterations q. For example, in each iteration with a larger dataset $D_q$, the test driver may generate training sets $D_{pi}$ for the next point p in the sequence so that training and testing for the sequence of set-sizes is performed over a number of iterations. This allows training results from prior iterations to be reused when generating the learning curves. Training and tests sets may also be constructed in various ways in test driver 30. As another example, for each point p in the sequence, a number n (e.g., n=5) training sets $D_{pi}$ may be generated and, for each training set $D_{pi}$, test driver 30 may then perform an x-fold cross-validation with a (y, 100-y) split. That is, x random subsets $D_{pij}$ containing y % of samples in $D_{pi}$ are selected, and model 24 is then trained on $D_{pij}$ and tested on the remaining samples in $D_{pi}$.

In evaluator 31, a class-specific performance metric can be obtained by averaging a performance metric for a given class over all tests performed by test driver 30 for a given point p in the current iteration q. In general, one or more performance metrics may be derived for each class, where each performance metric provides some measurement of model quality for classifying samples in that class. Exemplary performance metrics include per-class precision $Pr_c$ (i.e., the ratio of true positive classifications to true-plus-false positive classifications for a class), and per-class recall $R_c$ (i.e., the ratio of true positive classifications to the total number of test samples in a class). Another example here is the F1 score as the harmonic mean of recall and precision. In preferred embodiments, evaluator 31 may calculate both $Pr_c$ and $R_c$ for all classes. Additionally, evaluator 31 may calculate the class-specific metrics and also may calculate accuracy metrics for the model over all classes for test sets in the current iteration q. An overall accuracy metric A for each point p may be calculated, for example, as the average of class-specific F1 scores (macro-average) or simply by averaging the percentage of correct classifications for the entire test set over all test sets for point p in the current iteration (micro-average).

In step 45 of FIG. 3, learning curves are generated for each performance metric over the sequence of points p (i.e., the sequence of increasing-sized sets). The learning curve for model accuracy A can be obtained by plotting the accuracy metric obtained for each point p against the number $S_p$ of training samples in the sets. Class-specific learning curves for precision $Pr_c$ and recall $R_c$ can be obtained by plotting these metric values against the average number of training samples of class c in the datasets $D_{pi}$ for a point p. In preferred methods where all points p are defined in a given iteration with dataset $D_q$, these average numbers can be estimated based on set-size $S_p$ and the fraction of training samples of class c in $D_q$.

Figure 5A:
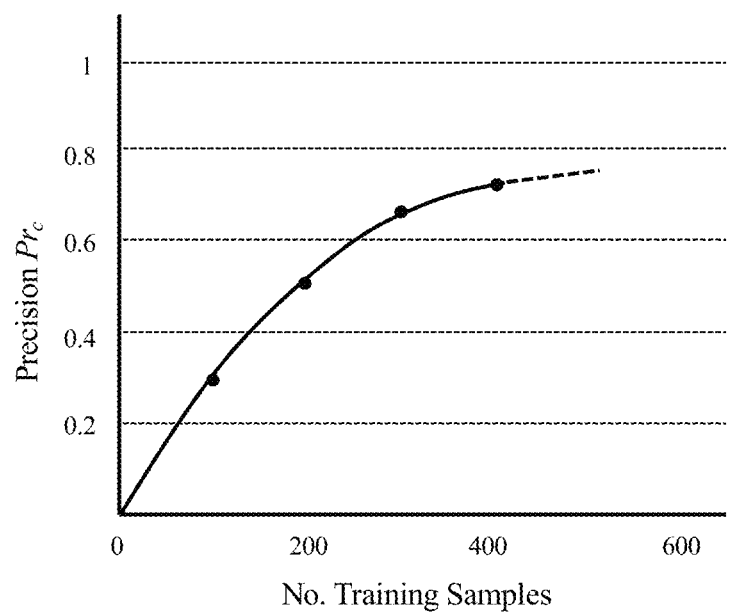
FIGS. 5a and 5b illustrate learning curves generated in a dataset management operation.
Figure 5B:
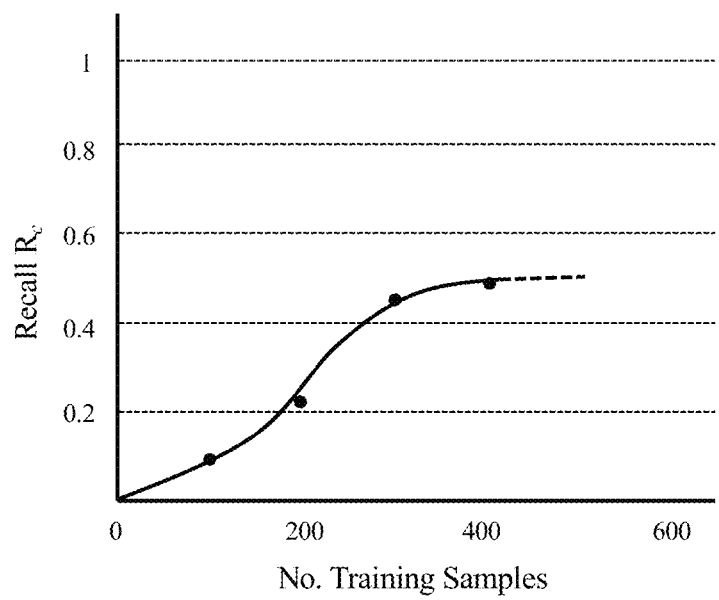

Referring now to FIGS. 5a and 5b, illustrations of learning curves generated in a dataset management operation are depicted. FIGS. 5a and 5b show examples of learning curves generated from precision and recall metrics $Pr_c$ and $R_c$ obtained for a sequence of P=4 points in an iteration q. Standard curve-fitting techniques may be used to define learning curves fitted to the points plotted for these metrics. If metrics from previous iterations are re-used for some points p, then the fraction of training samples in class c must be stored, for each iteration, in metrics database 29 for plotting of the learning curves. This may provide less evenly-spaced points, thus potentially less-accurate learning curves. The less evenly-spaced points may, however, be an adequate embodiment, for example, when resources are constrained. In addition to the class-specific curves, a model learning curve is similarly generated from the model accuracy metric A over all points p.

Evaluator 31 extrapolates the learning curves to higher numbers of training samples in the class c as indicated by the dashed extensions in FIGS. 5a and 5b. Extrapolation may be taken as a limited distance beyond the current point p, such as to a maximum distance dependent on the current point-spacing up to 100% for the quality measure. The curves may not be smooth in practice and the number of points p may typically be constrained by a training time for the model 24. The model accuracy curve may be similarly extrapolated to higher numbers of training samples than in the current dataset $D_q$.

Points on the extrapolated learning curves represent predicted values of the respective performance metrics. These predicted performance metrics (PPMs) are used by action planner module 32 in optimizing the improvement function. In particular, the improvement function defines some measure of overall improvement in the model performance as a function of the predicted improvement in the individual metrics with higher numbers of samples, per class for the class-specific metrics and overall for the accuracy metric. For example, the improvement function may measure overall improvement as a sum of predicted improvements in the individual metrics, or as a weighted or other function of predicted improvements. These improvements vary with number of additional samples $X_c$ in each class c, and overall additional samples $\Delta D$ in the dataset, which thus form basic variables for the improvement function.

The action planner may optimize an improvement function over all variables $X_c$, $\Delta D$ to identify appropriate augmentation actions such as: acquire $X_c$ additional samples for a single class c; or respective numbers $X_c$ of samples for more than one class c, or $\Delta D$ additional samples overall with an expected distribution between classes. For example, the action planner may optimize the improvement function over all variables $X_c$, ΔD to maximize the total improvement measure In preferred embodiments the optimization may be performed in relation to a "cost" measure for a set of actions as follows.

Actions can be selected from predetermined augmentation action types defined in action planner 32. Action types may include (a1) providing a number $X_c$ of further training samples in a class c, (a2) labeling a number Y of further training samples and (a3) labeling training samples in a number Z of sources of further training samples with an expected distribution of samples between classes. Sources of training samples may depend on the model application and may, for example, include: test runs such as time series of load/environment parameters on a computer system or other machinery; sound recordings such as voice recordings, or scanned documents, where training samples may be sentences or phrases; or digital images generally for pattern recognition applications. Numbers $X_c$, Y and Z may be on discrete scales and/or may specify minimum/maximum values as appropriate. Cost functions for the augmentation action types are also defined in action planner 32. Different cost functions may be associated with different action types and may define costs per training sample/source as appropriate. Different per-sample costs may be defined for different classes and/or costs may increase with increasing sample numbers.

A set of target performance metrics is defined for the model in action planner 32. For example, an overall target accuracy $A_T$ can be specified, and finer-grained targets can be specified for performance metrics for classes of interest. In the case of image, speech, or text samples, for instance, there may be a large "no interest" class and smaller classes of interest in the application. The present embodiment may assume that the individual targets are specified for an overall model accuracy and for a per-class precision and recall for each class of interest. Depending on the application, different classes may have different targets, and precision and recall targets may be different for a given class.

In this embodiment, the improvement function optimized by action planner 32 may indicate a predicted improvement towards a target in model performance. In particular, improvement towards a target is measured as a sum of the percentage gains up to the target for each individual targeted metric. The optimal set of actions is identified in action planner 32 by optimizing this improvement function in relation to a cost of the set of actions as determined from the cost functions associated with individual actions.

An example may now be illustrated where only class-specific targets are considered for simplicity. Assume that there are two classes A and B of interest and a "no interest" class C, with targets of 90% recall and 70% precision for both A and B. Assume current metrics (corresponding to the highest point p on the learning curves) of: $R_A$=85%; $R_B$=80%; $Pr_A$=60%; $Pr_B$=75%. Based on the extrapolated learning curves, assume that certain action of types (a1) and (a3) result in the following PPMs: $R_A$=92%; $R_B$=86%; $Pr_A$=64%; $Pr_B$=78%. The improvement function then gives an improvement measure for this action set of: 5+6+4+0=15.

Given the improvement function and the action costs, optimizing the improvement function in relation to cost of an action set may be a straightforward planning optimization. Standard optimization algorithms can be used by action planner 32 to perform the required optimization. An improvement target may be defined for the next phase and the cost to reach that target minimized or a cost budget may be specified for the next phase and the improvement achievable for that cost maximized. Details may depend on the function class used in the extrapolation. In a case with a linear extrapolation for a small extension, the formulae linking numbers of additional samples and achieved improvements are linear and directly solvable, with rounding to closest integers at the end. Alternatively, for example, a simple, differentiable function class may be chosen, particularly with relatively few points to extrapolate from. Gradient descent numerical methods may then be used to find a minimum or maximum on a multi-dimensional surface.

Embodiments may also be envisaged in which the improvement function is dynamically defined for an iteration, such as to define an improvement measure based on one or more class metrics which are identified as particularly low in relation to target. Metrics included in an improvement function may also be selected based on analysis of confusion matrices in embodiments below.

Figure 6:
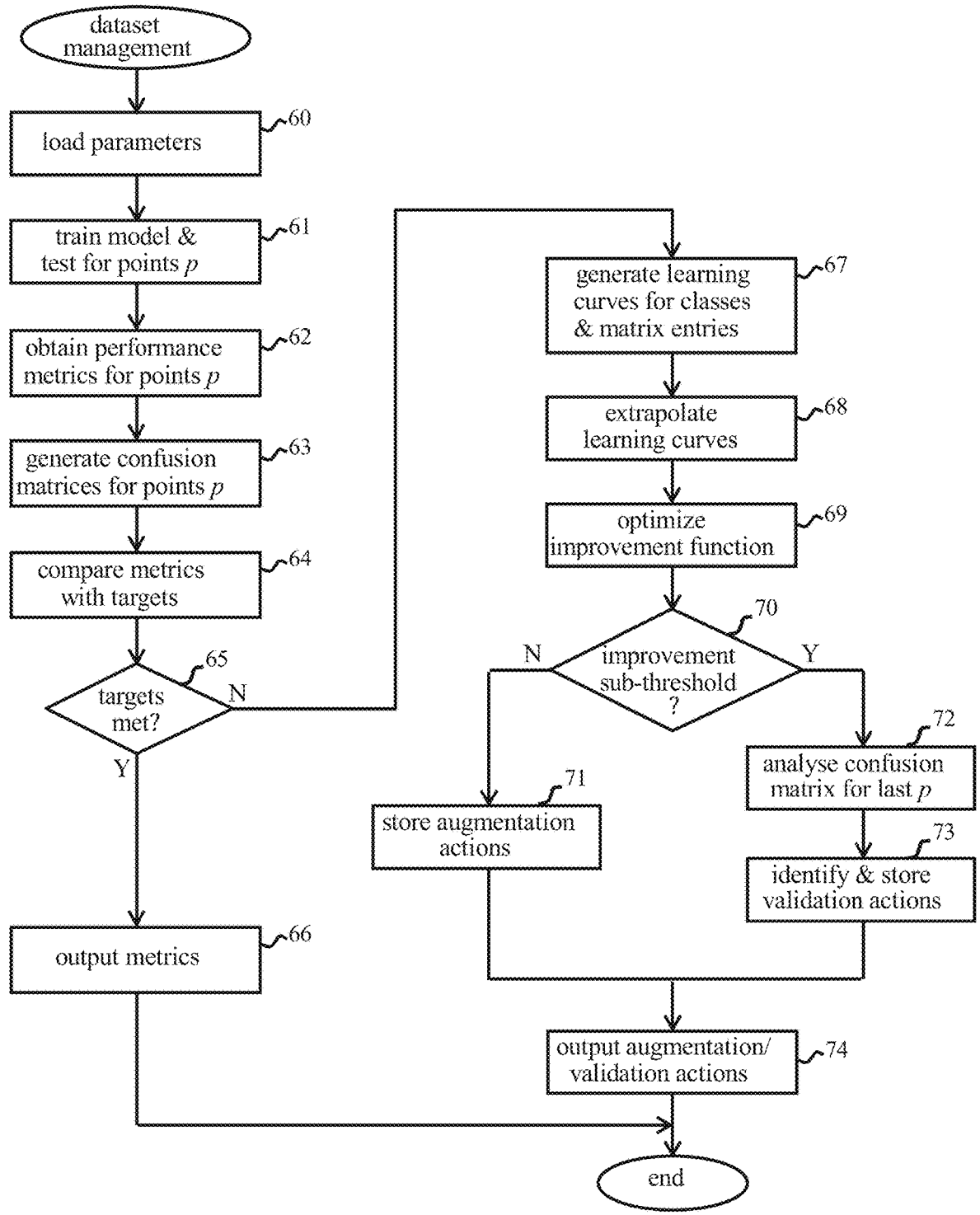
FIG. 6 indicates steps of a dataset management method in a preferred embodiment.

Referring now to FIG. 6, steps of a dataset management method in a preferred embodiment are depicted. FIG. 6 indicates steps of a preferred dataset management method employing confusion matrices.

Step 60 represents a loading of configuration parameters to MLM logic 20, including parameters for training/test sets, model performance targets, action types and cost functions. Step 61 represents training and testing of model 24 by test driver 30 for the sequence of points p described above. Step 62 represents calculations of the model and class-specific performance metrics for the point-sequence in evaluator 31. In step 63, evaluator 31 may also generate a confusion matrix for the performance of the model over the plurality of classes for each point p. A confusion matrix entry $CM_{c,d}$ may indicate the percentage of samples labeled as class c that are assigned to a class d by the model. Confusion matrix values are calculated from the test results from training with each set of training samples and corresponding values are averaged over all sets for a point p to obtain the confusion matrix entries $CM_{c,d}$ for each class pair (c, d).

Referring now to FIG. 7, an example of a confusion matrix used in the FIG. 6 method is depicted. FIG. 7 shows a portion of one example of a confusion matrix for an application in which a classification is performed to identify information technology (IT) services relevant to customer requirements in a Request for Proposal (RFP). Class labels for IT services are indicated by the row headers. Column headers indicate the class assignment by model 24 during testing. The matrix diagonal contains the correct assignments (i.e., true positives). High numbers for other entries show confusion between classes, indicating that these classes may need to be better distinguished. For example, samples labeled as "Asset" are often misclassified to "Account Management". Such confusion may occur for various reasons. There may be insufficient training data for one or both classes, labels may be incorrect for training samples in one or both classes or the classes were not well enough defined or changed over time so that samples were interpreted differently during labeling.

In step 64 of FIG. 6, evaluator 31 compares the performance metrics for the last point p in the sequence with the targets specified in step 60. If the targets are met, the metrics are provided as an output in step 66 and the process terminates. Otherwise, in step 67, the evaluator proceeds with the generation of the learning curves. In addition to the class-specific and model accuracy learning curves, the evaluator may generate confusion learning curves from the corresponding entries in the confusion matrices for the sequence of points p. Since a matrix entry $CM_{c,d}$ may have sizes of both classes c and d as parameters, an average value for the class sizes may be used to obtain a one-dimensional confusion curve. In step 68, all learning curves may be extrapolated as described earlier.

The remaining steps of FIG. 6 are performed by the action planner 32. In step 69, the action planner optimizes the improvement function for augmentation actions on the dataset, as described above. In step 70, the action planner may then detect if the predicted performance metrics for one or more classes indicate a sub-threshold performance improvement. In this embodiment, the action planner 32 checks for a sub-threshold improvement, for example, zero or less than a defined threshold improvement, in (at least) the overall model improvement measure optimized in step 69. If a subthreshold improvement is not identified at step 70, the set of augmentation actions determined from the step 69 optimization may be stored by the action planner in step 71. If a subthreshold improvement is detected in step 70, then in step 72 the action planner analyses the confusion matrix for the latest point p to identify, for each of the relevant classes, one or more other classes having the greatest confusion with that class. For example, for a given class c, the other classes d for which the sum of the confusion matrix entries $CM_{c,d}$ cover at least 50% of the errors can be identified for that class. As another example, the threshold used here may be set in dependence on distance of the current performance metrics for class c from their target values.

In step 73, the action planner may identify a set of validation actions to validate labels of training samples in dependence on results of the confusion matrix analysis. In this embodiment, the set of validation actions is identified from predetermined validation action types that may include: (v1) validating labels of training samples in a class $c_i$ which were assigned to a class $c_j$ by the model, where $c_i$ and $c_j$ are specified in the set of validation actions; and (v2) validating labels of all training samples in a pair of classes $c_i$, $c_j$, where $c_i$ and $c_j$ are specified in the set of validation actions. A cost function may be defined for these validation action types, for example, on a per-sample basis that may be the same for both actions. The action planner may identify the set of validation actions by selecting validation actions in dependence on cost of the resulting action set. For example, classes or class-pairs showing the highest levels of confusion or classes for which the performance metrics are furthest from target may be selected for cleaning up to a certain level of cost. The resulting validation actions are stored in step 73 and operation proceeds to step 74. Here, the action planner outputs the set of augmentation and/or validation actions generated by earlier steps, and operation is complete for the current iteration.

The FIG. 6 process iterates over successive iterations q. Typically, augmentation actions will be selected in early iterations to augment particular sample classes based on predicted improvement as before. However, when learning curves begin to level out before targets are reached, and performance improvement drops below a threshold, the confusion matrices are used to identify appropriate validation actions for cleaning class labels. Confusion learning curves generated in step 67 may be an output to operators for monitoring system progress and may be used in various steps to assist identification of actions. Optimization step 69, for instance, may be performed in dependence on the confusion matrices and/or associated learning curves. As examples, action planner 32 could select particular classes to be accommodated in the improvement function, such as those for which confusion curves show high confusion with other classes or the improvement function may be a function of predicted confusion values as well as other PPMs. Confusion values may also be used to weight contributions of classes to the overall improvement function according to confusion levels.

In preferred embodiments, the action planner 32 may check for a sub-threshold performance improvement in individual class PPM curves in step 70, and validation actions may be selected for some classes in addition to the set of augmentation actions. In a simplified form of the FIG. 6 process, instead of calculating confusion matrices and confusion learning curves over all points p, confusion matrices may be calculated only for the largest point p in step 72 of the process.

When validation actions have been implemented in the dataset 28, performance improvement may then be estimated for further such actions. In preferred embodiments, further learning curves may be generated for corresponding entries in the confusion matrices for successive iterations of the method in response to an implementation of a set of validation actions. Such further learning curves may indicate a variation of those entries with implemented validation actions and can be extrapolated to obtain predicted values of those entries. In an iteration of the process when these further learning curves are available, the action planner may optimize a function of both the PPMs and the predicted values from further learning curves to identify a set of augmentation and/or validation actions on the dataset. In any given iteration of the method, a set of validation actions may be identified in addition to or as alternative to a set of augmentation actions. For example, a cost may be allocated between augmentation/validation actions by weighting expected performance improvements from augmentation of some classes against need to clean classes with high confusion levels.

The use of confusion matrices in the above embodiments allows strategic incorporation of validation actions in the dataset management process and optimization of actions based on confusion levels as the model is trained. Optimal actions can be selected to maximize performance improvement, based on augmentation and/or cleaning of the dataset, for a given level of cost, allowing datasets to be managed and models to be trained in a highly resource-efficient manner.

Referring now to FIG. 8a, a class-distribution of training samples during operation of a dataset management process is depicted. Operation of system 20 will be demonstrated by the following simple example which assumes a classification system with only 3 classes A, B and C. Initial iterations result in augmentation of a dataset D as shown in the table of FIG. 8a.

After the first iteration with |D|=500 examples, no targets were reached and action (a3) above was selected by action planner 32. This resulted in acquisition of another 500 samples. As sample sources may have different class distributions, the sample numbers for classes A and B when |D|=1000 are not exactly twice those for |D|=500. Targets for Class A were almost reached at |D|=1000, but not those for B and C, and action (a1) was identified for classes B and C to get more sample in these classes. The sequence of set-sizes $S_p$ for points p=1 to 3 may then be defined in test driver 30 as $S_1$=500, $S_2$=1000, $S_3$=1500. To obtain evenly-spaced learning curves for all classes, the test driver defines training sets from D such that (exactly or approximately) $S_{1,A}$=700/3=233, $S_{2,A}$=700*2/3=467, $S_{1,B}$=$S_{1,C}$=400/3=133 and $S_{2,B}$=$S_{2,C}$=400*2/3=267 (where $S_{p,c}$ is the number of class c samples in training sets of size $S_p$). This may be done by directly selecting such subsets from the individual classes of samples or by selecting random sets of size 500 and 1000 from the current dataset D and relying on statistics to a give class distributions close to the overall distribution in D. Test driver 30 trains and tests the model for each test set as described above.

Referring now to FIG. 8*b*, performance metrics for FIG. 8*a* classes are depicted. Evaluator 31 then computes class-specific precision $Pr_{p,c}$ and recall $R_{p,c}$ for classes A, B and C by averaging the precision and recall metrics from test results at each point p=1 to 3. The testing for p=3, corresponding to the full dataset size |D|=1500 here, can be performed by x-fold cross-validation as described earlier. The resulting precision and recall values used to plot the class-specific learning curves for A and B are indicated in FIG. 8*b*.

Figure 9:
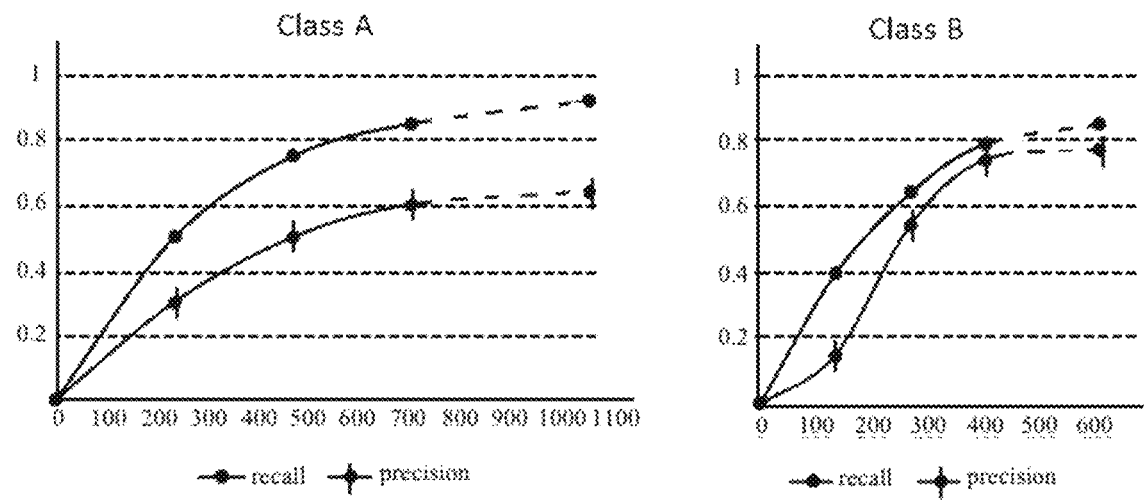
FIG. 9 shows learning curves and predicted performance metrics for FIG. 8a classes.

Referring now to FIG. 9, learning curves and predicted performance metrics for FIG. 8*a* classes are depicted. The learning curves for these classes are illustrated in FIG. 9. These curves have well-spaced points and are extrapolated as indicated to obtain predicted metric values up to 1050 samples (for Class A) and 600 samples (for class B) as indicated in the tables beneath these curves.

Confusion matrix entries $CM_{p,c,d}$ are similarly calculated for all class pairs c, d in the three classes, and all points p, by averaging corresponding confusion values over results at each point. Confusion learning curves are generated for these entries and can then be extrapolated. For example, for the confusion matrix entries $CM_{p,A,B}$, we have a fixed ratio $S_{p,A}/S_{p,B}=1.75$. This curve can be extrapolated easily to larger sets with the same ratio, for example, to possible values for the next iteration of $S_{4,A}=1050$, $S_{4,B}=600$. Extrapolated values may also be calculated for other ratios, such as 400 more samples in each class, if of interest and within the limits of the available data. The improvement function can then be optimized as described above to identify optimal actions on the dataset based on the predicted metrics for additional sample numbers and the associated action costs.

It may be appreciated that FIGS. 1-9 provide only an illustration of one embodiment and do not imply any limitations with regard to how different embodiments may be implemented. Many modifications to the depicted embodiment(s) may be made based on design and implementation requirements.

Various other changes and modifications can be made to embodiments described above. For example, a GUI provided by action tracker 33 may be integrated with a dashboard showing current performance results for the model. More than one model may be trained in parallel in system 20, and the GUI may allow selection of the currently best-performing model for use in an application at any given stage of training. Action planner 32 may include functionality for deciding when to stop training if targets cannot be reached, e.g. if all learning curves are flat or predict negative improvement, and provide appropriate outputs to a system operator. The action planner may also decide, based on learning curves for confusion matrix entries, when particular class-pairs should be joined due to associated confusion levels, and may indicate this to a system operator.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a dataset of training samples, labeled by class, during training of a model, the method comprising:
   training the model on a sequence of increasing-sized sets of the training samples and testing a performance of the model after training with each of the increasing-sized sets to obtain, for a plurality of classes, class-specific performance metrics corresponding to each set size;
   generating class-specific learning curves from the performance metrics for the plurality of classes;
   extrapolating the class-specific learning curves to obtain predicted performance metrics for higher numbers of training samples in the plurality of classes;
   optimizing a function of the predicted performance metrics, indicating a predicted improvement in a model performance, to identify a set of augmentation actions to augment the dataset for further training of the model; and
   providing an output indicative of the set of augmentation actions.

2. The method of claim 1, wherein cost functions are defined for respective augmentation actions and the set of augmentation actions is identified by optimizing the function in relation to a cost of the set of actions.

3. The method of claim 1, wherein the identifying the set of augmentation actions from predetermined augmentation action types further comprises:
   providing a number $X_c$ of further training samples in a class c where $X_c$ and c are specified in the set of actions;
   labeling a number Y of further training samples where Y is specified in the set of actions; and
   labeling training samples in a number Z of sources of further training samples where Z is specified in the set of actions.

4. The method of claim 1, wherein a set of target performance metrics is defined for the model and the function indicates the predicted improvement towards a target in the model performance.

5. The method of claim 1, further comprising:
   testing the model performance after training with each set of training samples;
   generating a confusion matrix for the model performance over the plurality of classes;
   generating confusion learning curves from corresponding entries in each of the confusion matrices for the sets of training samples; and
   performing the optimization in dependence on the confusion learning curves.

6. The method of claim 1, further comprising:
   implementing successive sets of actions on the dataset, wherein the successive sets of actions are performed iteratively.

7. The method of claim 6, wherein the successive sets of actions performed iteratively further comprises:
   when testing the performance of the model for at least a largest set of training samples, generating a confusion matrix for the performance of the model over the plurality of classes;
   detecting if the predicted performance metrics for one or more of the plurality of classes indicate a sub-threshold performance improvement and, for each such class, identifying one or more other classes having a greatest confusion with that class by an analysis of the confusion matrix;

identifying a set of validation actions to validate labels of training samples in dependence on results of the analysis; and providing an output indicative of the set of validation actions.

8. The method of claim 7, wherein a cost function is defined for the validation actions and the set of validation actions is identified by selecting validation actions in dependence on cost of the set of validation actions.

9. The method of claim 7, wherein the identifying the set of validation actions from predetermined validation action types further comprises:

validating labels of training samples in a class $c_i$ which were assigned to a class $c_j$ by the model, where $c_i$ and $c_j$ are specified in the set of validation actions; and validating labels of all training samples in a pair of classes $c_i$, $c_j$, where $c_i$ and $c_j$ are specified in the set of validation actions.

10. The method of claim 7, further comprising:

generating, for corresponding entries in each of the confusion matrices for successive iterations of the method in response to implementation of the set of validation actions, further learning curves for variation of those entries with implemented validation actions;

extrapolating the further learning curves to obtain predicted values of those entries; and in an iteration of the method, optimizing a function of the predicted performance metrics and the predicted values to identify the set of augmentation actions or validation actions on the dataset for further training of the model.

11. The method of claim 1, wherein the class-specific performance metrics for the class include a precision metric and a recall metric for the class.

12. The method of claim 1, further comprising:

obtaining accuracy metrics for the model over all classes for the increasing-sized sets;

generating model learning curves from the accuracy metrics;

extrapolating the model learning curves to obtain predicted accuracy metrics for higher numbers of training samples in the dataset; and optimizing a function of the predicted performance metrics and the predicted accuracy metrics to identify the set of actions.

13. The method of claim 1, wherein the training of the model includes iteratively performing a method as claimed in claim 1 in response to implementation of successive sets of actions on the dataset.

14. A computer system for managing training of a machine learning model, the system comprising memory storing a dataset of training samples, labeled by class, and control logic, comprising:

one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

training the model on a sequence of increasing-sized sets of the training samples and testing a performance of the model after training with each of the increasing-sized sets to obtain, for a plurality of classes, class-specific performance metrics corresponding to each set size;

generating class-specific learning curves from the performance metrics for the plurality of classes;

extrapolating the class-specific learning curves to obtain predicted performance metrics for higher numbers of training samples in the plurality of classes;

optimizing a function of the predicted performance metrics, indicating a predicted improvement in a model performance, to identify a set of augmentation actions to augment the dataset for further training of the model;

providing an output indicative of the set of augmentation actions; and implementing successive sets of actions on the dataset, wherein the successive sets of actions are performed iteratively.

15. The computer system of claim 14, wherein multiple cost functions are defined in the system for respective augmentation actions, and wherein the control logic is adapted to optimize at least one cost function in relation to a cost of the set of actions.

16. The computer system of claim 14, wherein the control logic further comprises:

testing the model performance after training with each set of training samples;

generating a confusion matrix for the model performance over the plurality of classes;

generating confusion learning curves from corresponding entries in each of the confusion matrices for the sets of training samples; and performing the optimization in dependence on the confusion learning curves.

17. The computer system of claim 14, wherein the control logic further comprises:

when testing the performance of the model for at least a largest set of training samples, generating a confusion matrix for the performance of the model over the plurality of classes;

detecting if the predicted performance metrics for one or more of the plurality of classes indicate a sub-threshold performance improvement and, for each such class, identifying one or more other classes having a greatest confusion with that class by an analysis of the confusion matrix;

identifying a set of validation actions to validate labels of training samples in dependence on results of the analysis; and providing an output indicative of the set of validation actions.

18. The computer system of claim 17, wherein a cost function is defined in the system for the validation actions, and wherein the control logic is further adapted to identify the set of validation actions by selecting validation actions in dependence on cost of the set of validation actions.

19. The computer system of claim 14, wherein the control logic further comprises:

generating, for corresponding entries in each of the confusion matrices for successive iterations of the method in response to implementation of a set of validation actions, further learning curves for variation of those entries with implemented validation actions;

extrapolating the further learning curves to obtain predicted values of those entries; and in an iteration of the method, optimizing a function of the predicted performance metrics and the predicted values to identify the set of augmentation actions or validation actions on the dataset for further training of the model.

20. A computer program product for managing a dataset of training samples, labeled by class, during training of a machine learning model, comprising:

one or more computer-readable tangible storage media and program instructions stored on at least one of the one or more computer-readable tangible storage media, the program instructions executable by a processor to cause the processor to perform a method comprising:

training the model on a sequence of increasing-sized sets of the training samples and testing a performance of the model after training with each of the increasing-sized sets to obtain, for a plurality of classes, class-specific performance metrics corresponding to each set size;

generating class-specific learning curves from the performance metrics for the plurality of classes;

extrapolating the class-specific learning curves to obtain predicted performance metrics for higher numbers of training samples in the plurality of classes;

optimizing a function of the predicted performance metrics, indicating a predicted improvement in a model performance, to identify a set of augmentation actions to augment the dataset for further training of the model; and providing an output indicative of the set of augmentation actions.

* * * * *